US008321286B2

(12) United States Patent
McDaniel et al.

(10) Patent No.: US 8,321,286 B2
(45) Date of Patent: Nov. 27, 2012

(54) METHOD AND APPARATUS FOR MEASURING REVENUE PERFORMANCE FOR A LODGING ESTABLISHMENT

(75) Inventors: William McDaniel, Columbia, MD (US); Tim Tenca, Germantown, MD (US); Prashant Dave, Bethesda, MD (US); David Nehme, Austin, TX (US)

(73) Assignee: Marriott International, Inc., Bethesda, MD (US)

( * ) Notice: Subject to any disclaimer, the term of this patent is extended or adjusted under 35 U.S.C. 154(b) by 1876 days.

(21) Appl. No.: 10/770,502

(22) Filed: Feb. 4, 2004

(65) Prior Publication Data

US 2005/0171821 A1    Aug. 4, 2005

(51) Int. Cl.
*G06G 1/14*       (2006.01)
*G06Q 20/00*    (2012.01)
*G06Q 10/00*    (2012.01)

(52) U.S. Cl. .............................................. 705/22; 705/5
(58) Field of Classification Search .................... 705/22, 705/5
See application file for complete search history.

(56) References Cited

U.S. PATENT DOCUMENTS

| | | | |
|---|---|---|---|
| 4,297,677 A | 10/1981 | Lewis et al. | |
| 5,881,231 A * | 3/1999 | Takagi et al. ................. | 709/212 |
| 5,918,209 A | 6/1999 | Campbell et al. | |
| 6,263,315 B1 | 7/2001 | Talluri | |
| 6,993,494 B1 * | 1/2006 | Boushy et al. ................. | 705/10 |
| 7,328,166 B1 * | 2/2008 | Geoghegan et al. .............. | 705/5 |
| 7,333,941 B1 * | 2/2008 | Choi ................................ | 705/5 |
| 7,386,492 B2 * | 6/2008 | Ginsburg et al. ............... | 705/28 |
| 7,430,518 B2 * | 9/2008 | Gliozzi et al. ..................... | 705/7 |
| 7,437,323 B1 * | 10/2008 | Valkov et al. ............... | 705/36 R |
| 2003/0009386 A1 * | 1/2003 | Menninger ..................... | 705/26 |
| 2006/0010023 A1 * | 1/2006 | Tromczynski et al. .......... | 705/8 |
| 2008/0240539 A1 * | 10/2008 | George et al. ................. | 382/133 |
| 2009/0292566 A1 * | 11/2009 | Bossert ............................. | 705/5 |

OTHER PUBLICATIONS

Robert G Cross, Jon A Higbie, David Q (Dax) Cross. (2009). Revenue Management's Renaissance: A Rebirth of the Art and Science of Profitable Revenue Generation. Cornell Hospitality Quarterly, 50(1), 56. Retrieved Mar. 28, 2009, from ABI/INFORM Global database. (Document ID: 1643416451).*

Weatherford, Lawrence R., Bodily, Samuel E.. (1992). A Taxonomy and Research Overview of Perishable-Asset Revenue Management: Yield Management, Overbooking, and Pricing. Operations Research, 40(5), 831. Retrieved Mar. 28, 2009, from ABI/INFORM Global database. (Document ID: 704020).*

S E Kimes. (1999). Group forecasting accuracy in hotels. The Journal of the Operational Research Society, 50(11), 1104-1110. Retrieved Mar. 28, 2009, from ABI/INFORM Global database. (Document ID: 46970264).*

(Continued)

*Primary Examiner* — Beth V Boswell
*Assistant Examiner* — Folashade Anderson
(74) *Attorney, Agent, or Firm* — DLA Piper LLP US (57) ABSTRACT

Methods and apparatuses for calculating an optimal revenue total yield for both sleeping and function space in a hospitality establishment for a set of demand that includes both group and transient demands. In a preferred embodiment of the invention, the revenue optimization problem is characterized as a mixed-integer linear programming (MILP) problem and solved using MILP techniques. Preferably, a small value is assigned to the "cost" of a room upgrade and the cost of room upgrades are included in the revenue function to be optimized. In some embodiments of the invention, the actual revenue yield is compared to the optimum revenue yield.

30 Claims, 4 Drawing Sheets

OTHER PUBLICATIONS

Netessine, Serguei. Yield Managment. Diss. University of Pennsylvania, 2002. 2002. Robert Shumsky University of Rochester.*

Bitran, Gabriel R., and Susana V. Mondschein. "An Application of Yield Management to the Hotel Industry Considering Multiple Day Stays." Operations Research May & Jun. 1995.*

Rex S. Toh and Frederick DeKay, "Hotel room-inventory management: An overbooking model," Cornell Hotel and Resturant Administration Quarterly; Aug. 2002; 43, 4.*

Marriot International: Total Hotel Revenue Management system (Oct. 2001).

Marriot International: The Revenue Opportunity Model Report on MRDW Self-Paced Training (2002).

Anthony Ingold et al., "Yield Management: Strategies for the Service Industries, Second Edition", South-Western Cengage Learning (2000).

Robert G. Cross, "Revenue Management: Hard-Core Tactics for Market Domination", Broadway Books, New York (1997).

E. Castillo et al., "Chapter 2: Mixed-Integer Linear Programming", Building and Solving Mathematical Programming Models in Engineering and Science, John Wiley and Sons Inc., pp. 25-46 (2002).

* cited by examiner

METHOD AND APPARATUS FOR MEASURING REVENUE PERFORMANCE FOR A LODGING ESTABLISHMENT

BACKGROUND OF THE INVENTION

1. Field of the Invention

The invention relates to measuring financial performance in general and more particularly to a method and apparatus for measuring the financial performance of an entity for a given demand.

2. Background

The hospitality industry is extremely competitive. In order to succeed in the hospitality industry, proper management of available resources is important. Available resources in the hospitality industry include rooms in which guests sleep and function space (e.g., ballrooms, meeting rooms, etc.) used by guests for other purposes. It is common in the hospitality industry to classify consumers of these resources as belonging to one of two types: transient and group. Transient consumers are those consumers who need a single room or a small number of rooms in which to sleep for a period of time, but who do not utilize function space. Group consumers are those consumers who need a large number of rooms. Group consumers also typically, but not necessarily, require function space.

Where the demand for resources is less than the supply (i.e., occupancy is low), resource management is simple—all demands (i.e., requests for rooms and/or function space) are accepted (i.e., rooms and function space are sold to all customers who ask for it). The more difficult management problem occurs when demand, or expected demand, exceeds supply. In this situation, effectively managing resources requires decisions as to which demands (requests) for rooms and function space to accept and which to refuse.

Further complicating the management issue is the existence of different rates for the same room. A hospitality establishment such as a hotel often has an established "rack rate" at which it will rent a given room to a single person with little or no advance registration. The same room will often be rented to a person who is part of a group at a different, lower rate, and may be rented at yet another promotional rate at different times.

Additionally, hospitality establishments often enter into arrangements with resellers such as tour operators under which the reseller agrees to fill a large volume of rooms from the hospitality establishment in return for a discounted rate. Under such agreements, the hospitality establishment often must provide a room to such resellers whenever the room is requested, even if the hospitality establishment believes there will be a demand for the room (i.e., an opportunity to rent the room) from higher paying customers (this is sometimes referred to as last room availability).

As a practical matter, it is necessary to make management decisions as to whether to dedicate a resource (i.e., confirm a reservation) when the demand is made. This means, for example, that a hotel with 15 available rooms for an upcoming weekend must make a decision on a group demand for 10 rooms not knowing whether other demands (which may be transient or group demands) for some or all of those rooms will occur after the group demand is received.

Some attempts at implementing rules and procedures for responding to (i.e., deciding whether to accept or reject) these demands have been made. These rules and procedures are commonly referred to as "revenue management controls," "revenue optimization techniques," or "yield management." The effectiveness of these revenue management controls can be measured in a number of ways. One possible way of measuring the effectiveness is by comparing the actual occupancy rate with the theoretical maximum occupancy rate for a given demand. However, this measurement technique ignores the aforementioned difference in room rates. A more effective measurement technique is to measure effectiveness by comparing an amount of revenue or profit actually realized as a function of total revenue or profit that could have been realized for a given demand amount had the optimal decisions on whether to accept or deny a demand been made.

Typical management effectiveness measurement techniques in the hospitality industry are concerned only with the transient portion of the management problem. For example, some existing techniques completely ignore revenue and profit from function space and simply subtract rooms rented to group guests from the "inventory" of available rooms for which management effectiveness is measured.

What is needed is a method and apparatus that measures the management effectiveness for both function and room space for both group and transient customers.

BRIEF SUMMARY OF THE INVENTION

The present invention addresses the aforementioned issues to a great extent by providing methods and apparatuses for calculating an optimal total yield, which may be revenue or profit, for both individual space (e.g., sleeping rooms) and function space (e.g., ballrooms) in an entity (e.g., a hospitality establishment) for a set of demands that includes both group and transient demands. In a preferred embodiment of the invention, the optimization problem is characterized as a mixed-integer linear programming (MILP) problem and solved using MILP techniques. In some embodiments, a small value is assigned to the "cost" of a room upgrade and the cost of room upgrades are included in the revenue or profit function to be optimized. In some embodiments of the invention, the actual revenue or profit yield is compared to the optimum revenue or profit yield.

BRIEF DESCRIPTION OF THE FIGURES

A more complete appreciation of the invention and many of the attendant features and advantages thereof will be readily obtained as the same become better understood by reference to the following detailed description when considered in connection with the accompanying drawings, wherein.

DETAILED DESCRIPTION

Disclosed is a computer system and a computerized method for calculating a potential optimum yield for an entity for a set of demands including both transient demands and group demands comprising: a processor; and a memory for storing a set of demands, the memory connected to the processor. The processor is configured for: obtaining at least one set of past demands including both past transient demands and past group demands for the at least one configurable space, the at least one space comprising transient individual space, group individual space, and group function space; and calculating, by a processor, at least one potential optimum yield that includes both at least one transient yield from the transient individual space, and at least one group yield from the group individual space and the group function space. The calculating comprises: determining constraints related to the at least one space; determining bounds related to the at least one space; identifying which past demands for the at least one space should have been accepted in order to optimize the at least one potential optimum yield, subject to the constraints and the bounds; and determining the at least one potential optimum yield utilizing the at least one set of past demands.

The present invention will be discussed with reference to preferred embodiments of methods and apparatuses for calculating an optimal revenue or profit for a hospitality establishment for a given demand set. Specific details are set forth in order to provide a thorough understanding of the present invention. The preferred embodiments discussed herein should not be understood to limit the invention. Furthermore, for ease of understanding, certain method steps are delineated as separate steps; however, these steps should not be construed as necessarily distinct nor order dependent in their performance.

As used herein, a "demand" is request for a room or function space. Demands may be made, for example, by customers who literally walk up to a front desk at a lodging establishment or by customers who make a telephone call to the individual lodging establishment or to a nationwide reservation system, or over the Internet. Demands are recorded as they are received whether or not they are accepted (i.e., whether or not a sleeping room or function space is rented to the customer making the demand). In the preferred embodiments discussed below, the demands from individual transient customers are aggregated into a four dimensional array of a number of demands for each arrival date (AD), length of stay (LS), rate category (RC), and room type (RT). In contrast, the group demands are not aggregated but rather are treated separately. As will be discussed in further detail below, the preferred embodiments allow any number of transient demands for a given arrival date, length of stay, rate category and room type to be accepted. That is, none, one, some, or all of the demands for a given AD, LS, RC and RT may be accepted in order to optimize profit. This reflects the fact that transient demands, unlike group demands, are usually received for one room at a time. Group demands are not separable and must be accepted or rejected in their entirety.

It should also be noted that preferred embodiments of the invention decide which demands to accept or reject without consideration of whether the demands are made by resellers from whom the hospitality establishment is contractually obligated to accept demands. In this way, the difference between the optimal yield and the actual yield will reflect some of the "cost" (i.e., the difference between what revenue or profit was actually received as a result of allocating the room to a demand by the reseller pursuant to a contractual arrangement rather than allocating the room to a transient demand at a higher rate) of the arrangement with the reseller to be determined.

The preferred embodiments discussed herein will be illustrated in the context of a fictional hotel and a fictional set of transient and group demands for a three day period (days 0, 1, and 2). In practice, the usual period is one month. The fictional hotel has 20 each of three types of rooms designated as room types (RT) 0, 1, and 2. Room type 0 is the smallest and least desirable, and room type 2 is the largest and most desirable. On any given night, not all rooms may be available. A room might not be available due to, for example, a leaking pipe in the room or renovations being done to the room. Table 5 lists the availability of the various rooms in the fictional hotel for the fictional three day period of the example.

Figure 1:
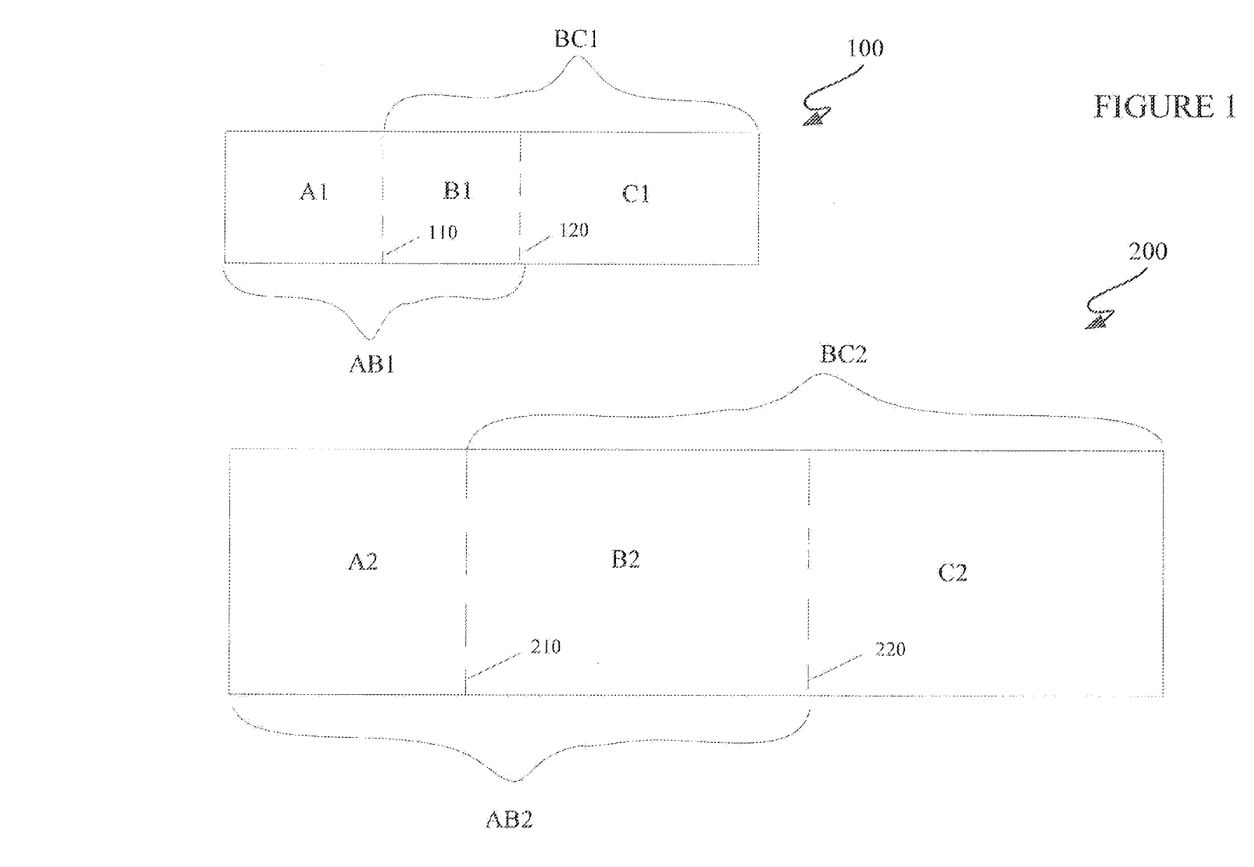
FIG. 1 is a block diagram representing configurable function space in an exemplary hotel.

The fictional hotel has three function space areas: two ballrooms referred to as BALL1 and BALL2, and an outdoor patio near the pool referred to as POOL. The POOL space cannot be sub-divided into smaller function spaces. However, each of the ballrooms BALL1 and BALL2 includes two folding, retractable walls which allow the ballrooms to be divided into smaller, function spaces (the smallest function spaces, which cannot be further divided, are referred herein as indivisible specific spaces). This is illustrated diagrammatically in FIG. 1. Ballroom 100 BALL1 has two walls 110,120. When both walls 110,120 are extended, BALL1 is divided into three indivisible specific spaces (sometimes referred to as salons) A1, B1, C1. If wall 110 is extended and wall 120 is retracted, BALL1 is divided into salon A1 and meeting room BC1 (BC1 is the combination of function spaces B1 and C1). Conversely, if wall 110 is retracted and wall 120 is extended, BALL1 is divided into meeting room AB1 and salon C1. Ballroom 200 BALL2 is similarly configurable into function spaces A2, B2, C2, AB2 and BC2 through the selective extension and retraction of walls 210, 220. Table 9 illustrates the square footage of each of the various function spaces for our fictional hotel. As illustrated in Table 9, these function spaces are assigned a function space category (also referred to herein as target space type or TST) of 0-7 depending on their square footage, with the smallest spaces assigned a space category/TST of 0 and the highest assigned a space category/TST of 7. It will be assumed that two function spaces with the same square footage/space category are interchangeable (e.g., a group demand for a target space type or space category 3=300 sq. ft. can be satisfied by function space C2 or BC1), and that a demand for any smaller function space can be filled with any larger function space (e.g., a demand for a 300 square foot function space can be filled with a function space with a space category of 3=300 sq. ft. or any other function space with a lager square footage (a space code greater than 3). Table 7 lists the various TSTs for the hotel.

A set of fictional transient sleeping room demands for our fictional hotel is listed in Table 6, and a set of group demands (which are sometimes referred to herein as "opportunities" and which include both sleeping room and function space components) is set forth in Tables 11-13. As shown therein, the fictional example includes three group demands with identifiers (OID) of "ATT," "IBM," and "CSCO."

Figure 2:
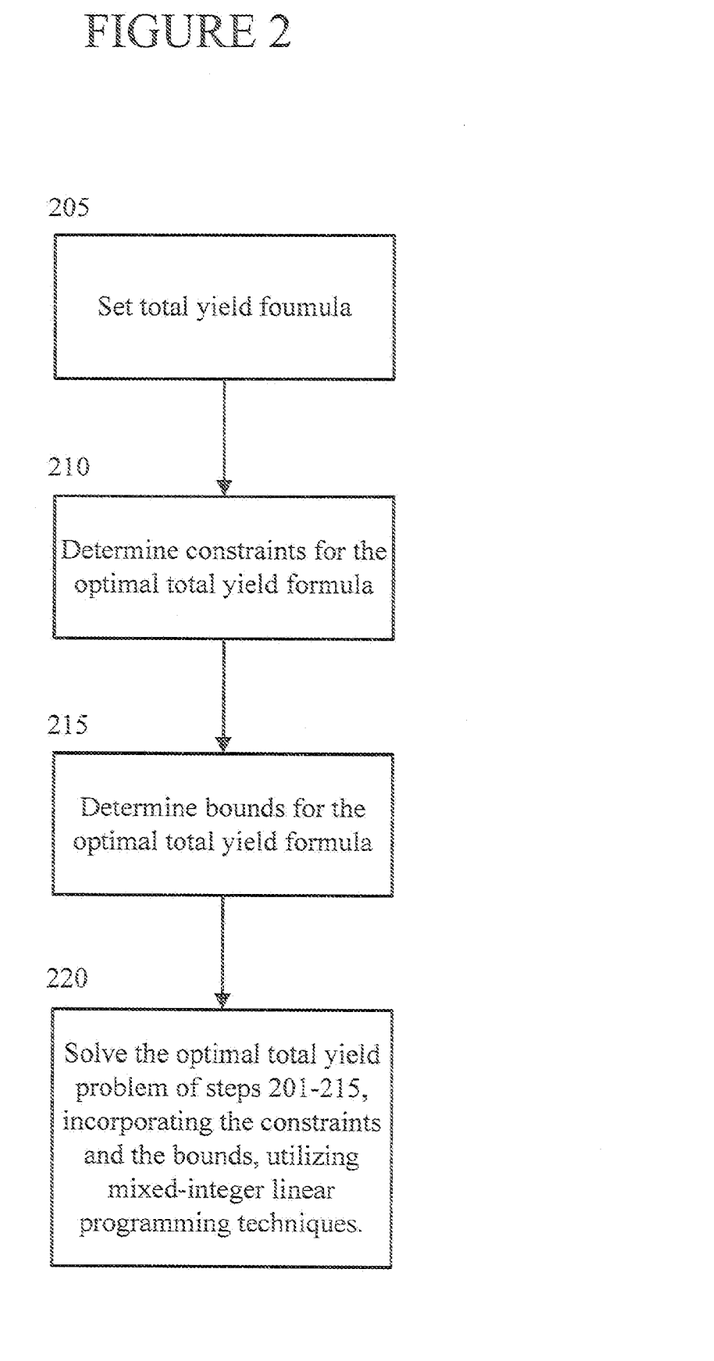
FIG. 2 is flowchart illustrating an overview of the method, according to one embodiment of the present invention.

FIG. 2 is flowchart illustrating an overview of a method for calculating an optimal yield according to one embodiment of the present invention. The yield may be either revenue or profit. The method illustrated in FIG. 2 calculates an optimal total yield for both sleeping rooms and function space in a hospitality establishment for a demand set including both transient and group demands. In step 205, a yield formula that includes yield from both individual space (i.e., sleeping room) and function space for both transient and group demands is set. In step 210, constraints under which the yield is optimized are determined. As used herein, a "constraint" is a condition that impacts the optimum yield. In step 215, bounds for the revenue optimization problem are determined. In step 220, the optimal total yield problem formulated in steps 205, 210 and 215 is solved utilizing mixed-integer linear programming (MILP) techniques.

Set Yield Equation

In preferred embodiments of the invention, determining an optimum yield given a set of demands is preferably formulated as a mixed integer linear programming problem. The objective of the problem is to maximize the yield (which may be revenue or profit) from both the sleeping space and the function space of a hospitality establishment for both group and transient guests. The following example will be illustrated in terms of revenue but it should be understood that profit may be substituted for revenue in the following equations.

The total revenue R is defined as:

$$R = TrRev - 0.001 UpCst + GrRev$$

where TrRev is the revenue associated with all accepted transient demand, GrRev is the revenue associated with all acceptable group demand, and UpCst adds a penalty for upgrading sleeping rooms.

Determine Constraints

Figure 3:
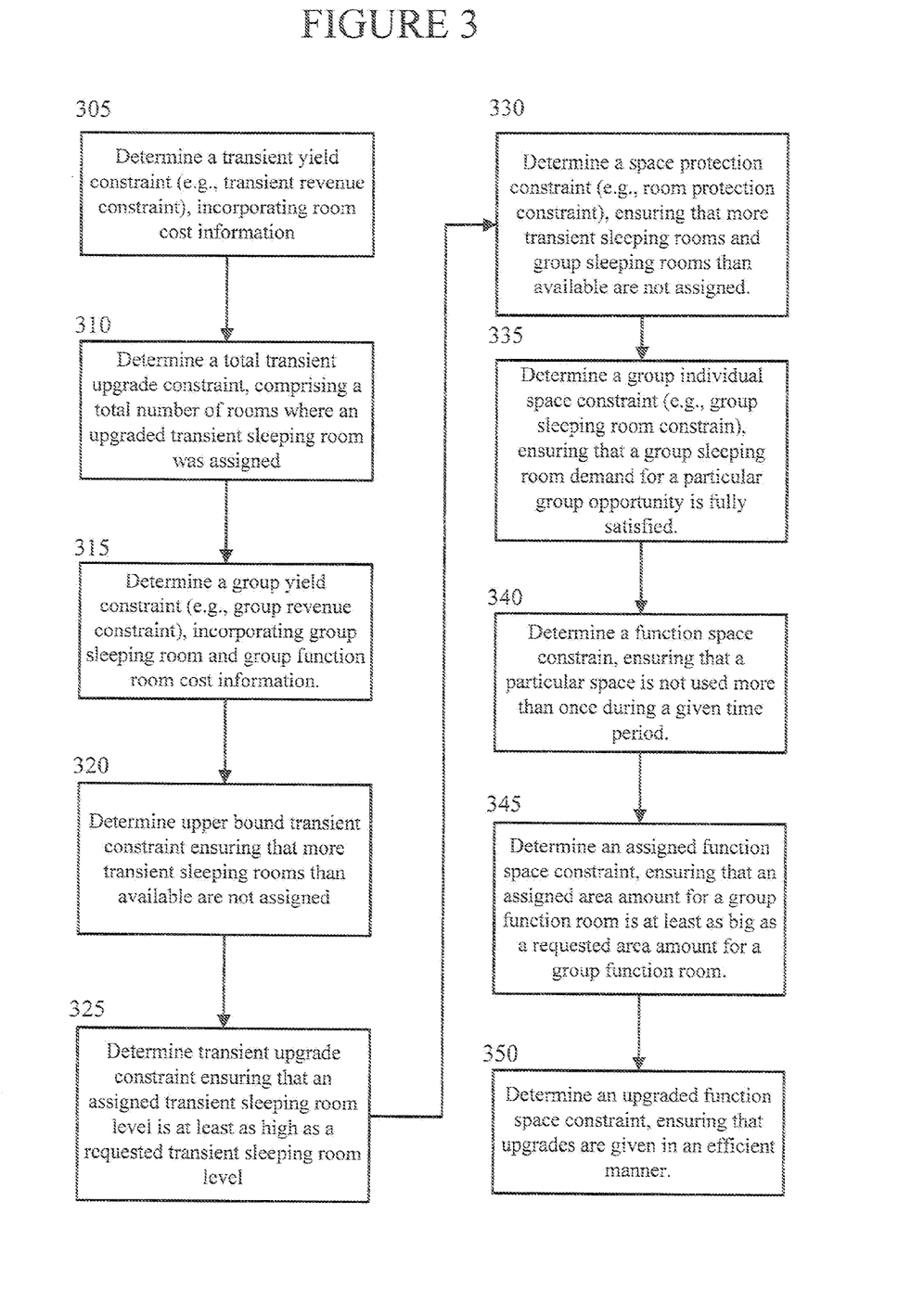
FIG. 3 is a flowchart illustrating various constraints and how the various constraints are determined.

FIG. 3 is a flowchart illustrating various constraints and how the various constraints are determined. The first three constraints are essentially definitions of the three components of the revenue formula described above.

In step 305, the transient revenue TrRev constraint TrRev-Def is set, defining the revenue for the transient rooms that have been accepted by taking the cost of each accepted room into account.

$$-\sum_{i} R(i)x \cdot AD(i) \cdot LS(I) \cdot RC(i) \cdot RT(i) + TrRev = 0$$

Or written another way:

$$TrRev = \sum_{i} R(i)x \cdot AD(i) \cdot LS(i) \cdot RC(i) \cdot Rt(i)$$

where i is a transient demand, x(i).AD(i).LS(i).RC(i).RT(i) is an integer value representing the number of demands i for a corresponding AD, LS, RC and RT that are accepted, and R(i) is the revenue associated with the demand i. As discussed above, the aggregated demands i preferably take the form of a four dimensional array, where the indices are arrival date (AD), length of stay (LS) (a length of stay of 0 represents one night), rate category (RC), and room type (RT) and the values in the array represent the number of sleeping rooms demanded for the corresponding indices. The arrival date (AD) and length of stay (LS) are self explanatory. The rate category (RC) corresponds to a dollar amount associated with each day the room is rented. The room type (RT) refers to the size and type of room (e.g., single room, suite).

There is a separate x variable for each demand record as indicated in Table 2. I in Table 2 represents the total number of demand records. It should be understood that the total number of demand records I may be less than the total number of possible combinations of AD, LS, RC and RT because a demand for a particular combination of AD, LS, RC and RT may not have been received in a particular period of interest.

In our fictional example, the transient revenue TrRev is calculated, using the four transient demands listed in Table 6, as follows:

TrRev=(300*x.0.2.0.0)+(100*x.1.0.0.1)+
(120*x.2.0.1.1)+(150*x.2.0.2.2)

Note that there are four x variables (x.0.2.0.0, x.1.0.0.1, x.2.0.1.1, and x.2.0.2.2), one for each of the four transient demands listed in Table 6. The coefficients R(i) of the four x variables are obtained by multiplying the room rate from Table 6 by the length of stay LS. Thus, for example, in the first value, the room rate is 100 per night, with a length of stay (LS) of 2 (meaning three nights), so the revenue for three nights at 100 per night is 300.

In step 310, the upgrade cost constraint UpCst Def is set. The upgrade cost UpCst is an integer value that represents the number of times a transient guest is upgraded to a better (e.g., more expensive) sleeping room at no cost to the customer. By multiplying UpCst by −0.0001 (or any other small constant) in the revenue equation, a small "cost" is assigned to room upgrades. This is done to ensure that the model will not unnecessarily assign upgraded sleeping rooms for transient demands that are accepted. The constraint is:

$$-\sum_{i} \sum_{ART>RT(i)} y \cdot AD(i) \cdot LS(i) \cdot RC(i) \cdot RT(i) \cdot ART + UpCst = 0$$

Or written another way:

$$UpCst = \sum_{i} \sum_{ART>RT(i)} y \cdot AD(i) \cdot LS(i) \cdot RC(i) \cdot RT(i) \cdot ART$$

where y.AD(i).LS(i).RC(i).RT(i).ART are the room allocation variables that represent the number of rooms of allocated room type ART that are allocated to each transient demand i for room type RT. Thus, for each x variable, there is a list of y variables associated with room types that can be allocated to fill the demand i, which must be as good or better than the type of room in the demand i. Thus, the total number of y variables is $$\sum_{i} (NRT - RT(i) + 1),$$

where NRT is the number of room types in the lodging establishment (3 in the fictional example) and RT(i) is the room type associated with demand i. The upgrade cost UpCst is thus calculated by looking at each demand itinerary i, and adding up the transient rooms that were assigned an upgrade (e.g., where ART>RT(i)).

Using the example demands in Table 6, and assigned room type (ART) values where ART>RT(i) (e.g., thus, if RT is 0, ART is 1 and 2), the upgrade cost UpCst is calculated as follows:

UpCst=y.0.2.0.0.1+y.0.2.0.0.2+y.1.0.0.1.2+y.2.0.1.1.2

In step 315, the group revenue GrRev constraint GrRevDef is set. This constraint defines the group revenue GrRev portion of the revenue equation. The group revenue constraint GrRevDef is:

$$-\sum_{OID} R(OID)wOpp \cdot OID + GrRev = 0$$

Or written another way:

$$GrRev = \sum_{OID} R(OID)wOpp \cdot OID$$

where w.Opp.OID is a binary value representing whether or not a group demand (or opportunity) was accepted (if the opportunity OID is accepted, wOpp.OID is equal to 1, if the opportunity was turned down, w.Opp.OID is equal to 0); and R(OID) is the revenue associated with the group demand. As set forth in Table 2, there are NOID of these binary variables, where NOID represents the number of group demands. Unlike the transient demands i, the group demands OID are not aggregated and, because of their nature as a group demand, must be accepted or rejected in their entirety—hence the binary value wOpp.OID associated with each group demand. The group demands OID include both a function space component and a sleeping room component as discussed above.

Using the example values from Table 11 for R(OID), the group revenue is calculated as:

GrRev=2001wOpp.ATT+2002wOpp.CSCO+ 2000wOpp.IBM

In step 320, an upper bound constraint xUbCon.i is set for each demand i. This constraint represents an upper bound on the number of sleeping rooms that the model can allocate to a transient demand (e.g., if there are 100 rooms in an aggregated demand i for a given AD, LS, RC and RT, the model cannot allocate more than 100 rooms to that demand i). The upper bound constraint xUbCon.i is:

xUbCon.i:x.AD(i).LS(i).RC(i).RT(i)≦N(i)∀i where x.AD(i), LS(i), RC(i), and RT(i) are as previously described and N(i) represents the number of sleeping rooms for demand i. ∀i signifies "for all i".

Using the demand information in Table 6, the four upper bound constrains xUbCon.i for each of the four demands i in the fictional example are as follows:
xUbCon.0.Def:x.0.2.0.0≦3
xUbCon.1.Def:x.1.0.0.1≦4
xUbCon.2.Def:x.2.0.1.1≦5
xUbCon.3.Def:x.2.0.2.2≦6

In step 325, the transient upgrade and allocation constraints TrUpg.AD(i).LS(i).RC(i).RT(i) for each of the demands i are set. These constraints ensure that customers are assigned to a room at least as "good" as the room type they requested (e.g., if someone requested room type 1, they would be assigned room type 1 or 2, but would not be downgraded to inferior room type 0). Thus:
TrUpg.AD(i).LS(i).RC(i).RT(i).Def:

$$-x \cdot AD(i) \cdot LS(i) \cdot RC(i) \cdot RT(i) + \sum_{ART \geq RT(i)} y \cdot AD(i) \cdot LS(i) \cdot RC(i) \cdot RT(i) \cdot ART \geq 0 \quad \forall i$$

Or written another way:

$$\sum_{ART \geq RT(i)} y \cdot AD(i) \cdot LS(i) \cdot RC(i) \cdot RT(i) \cdot ART \geq x \cdot AD(i) \cdot LS(i) \cdot RC(i) \cdot Rt(i) \quad \forall i$$

where x.AD(i).LS(i).RC(i).RT(i) and y.AD(i).LS(i).RC(i).RT(i).ART are as described above. To ensure customers are not being downgraded, this constraint requires the assigned room type (ART) to be greater than or equal to the room type (RT). For example, when the room type RT is 0, the allowable values for the ART are 0, 1, 2; when the RT is 1, the allowable values for ART are 1, 2; and when the RT is 2, the only allowable value for ART is 2.

Using the example values in Table 6, we get the following constraints.
TrUpg.0.2.0.0.Def: −x.0.2.0.0+y.0.2.0.0.0+y.0.2.0.0.1+ y.0.2.0.0.2≦0
TrUpg.1.0.0.1.Def: −x.1.0.0.1+y.1.0.0.1.1+y.1.0.0.1.2≦0
TrUpg.2.0.1.1.Def: −x.2.0.1.1+y.2.0.1.1.1+y.2.0.1.1.2≦0
TrUpg.2.0.2.2.Def: −x.2.0.0.2+y.2.0.2.2.2≦0

In step 330, the room protection RmPr.SD.RT.Def constraints are set. These constraints define the total number of assigned sleeping rooms of a given room type that are allocated to transient and group demands. As will be discussed below, these constraints are used together with a boundary condition to ensure that the total number of sleeping rooms of a given type allocated to transient and group demands do not exceed the total amount of hotel sleeping rooms of that room type that are available for a given day. In other words, these constraints ensure that the model cannot accept more demands for sleeping rooms than the hospitality establishment can accommodate. The room protection constraints are as follows
RmPr.SD.RTDef:

$$\left[\sum_{i|AD(i)\leq SD(i), AD(i)+LS(i)\geq SD, ART=RT} y \cdot AD(i) \cdot LS(i) \cdot RC(i) \cdot RT(i) \cdot ART + \sum_{OID}\sum_{rt|ART(rt)=RT} yOpp \cdot OID \cdot SD \cdot RT \cdot ART(RT)\right] - RmPr(SD, RT) \leq 0$$

There is a room protection constraint RmPr.SD.RT for each stay date (SD) and room type (RT). Thus, as shown in Table 2, there are NSD*NRT such RmPr constraints, where NSD is the number of stay dates (usually 28 but in our example, 3 (0, 1, and 2)), and NRT is the number of room types (3 in our example). The variables y.AD(i).LS(i).RC(i).RT(i).ART and x.AD(i).LS(i).RC(i).RT(i) are as described above. The summation for these variables is taken for all i where all three of the following conditions are met: (i) the arrival date must be before or on the stay date in question (i.e., AD(i)≦SD(i)), (ii) the arrival date plus the length of stay must be greater than or equal to the stay date in question (i.e., AD(i)+LS(i) SD), and the assigned room type must be equal to the room type in question (i.e., ART=RT). The group sleeping room allocation variables yOpp.OID.SD.RT.ART represent the number of rooms of allocated room type ART that are allocated to fill each accepted group demand OID for a room type RT. The summation for these variables is taken for room types where the assigned room type (ART) is equal to the room type (RT) corresponding to the constraint, for all opportunity IDs (OID).

Using example stay dates (SD) and room types (RT) from Table 5, the transient demand information from Table 6, and the group demand sleeping room information from Table 12, the RmPr constraints are as follows:
RmPr.0.0.Def: y.0.2.0.0.0+yOpp.AT7.0.0.0+yOpp.C-SCO.O.0.0+yOpp.IBM.O.0.0−RmPr.0.0≦0
RmPr.0.1.Def: y.0.2.0.0.1+yOpp.ATT.0.0.1+yOpp.C-SCO.0.0.1+yOpp.IBM.0.0.1−RmPr.0.0≦0
RmPr.0.2.Def: y.0.2.0.0.2+yOpp.ATT.O.0.2+yOpp.C-SCO.0.0.2+yOpp.IBM.0.0.2−RmPr.0.2≦0
RmPr.1.0.Def: y.0.2.0.0.0−RmPr1.0≦0
RmPr.1.1.Def: y.0.2.0.0.1+y1.0.0.1.1+yOpp.ATT.1.1.1+ yOpp.IBM.1.1.1−RmPr.1.1=0

RmPr.1.2.Def: y.0.2.0.0.2+y.1.0.0.1.2+yOpp.ATT.1.1.2+
  yOpp.IBM.1.1.2−RmPr.1.2=0
RmPr.2.0.Def: y.0.2.0.0.0−RmPr.2.0−RmPr.2.1.Def:
  y.0.2.0.0.1+y.2.0.0.1.1−RmPr.2.1≦0
RmPr.2.2.Def: y.0.2.0.0.2+y.2.0.0.1.2+y.2.0.0.2.2−
  RmPr.2.2≦0

In step 335, the group sleeping room constraint GpRmPr.OID.SD.RT.Def is set, ensuring that the sleeping room demand for a given group demand/opportunity is fully satisfied (e.g., if a group demand/opportunity is accepted, everyone in the group must be given a sleeping room). For each group demand/opportunity, there is a separate group sleeping room constraint for each stay date and room type on which a sleeping room is requested in the group demand/opportunity. The form of the group sleeping room constraints is:

$$GpRmPr \cdot OID \cdot SD \cdot RT \cdot Def: \sum_{ART \geq RT} yOpp \cdot OID \cdot SD \cdot RT \cdot ART - N(OID, SD, RT) wOpp \cdot OID \geq 0$$

Or written another way:

$$\sum_{ART \geq RT} yOpp \cdot OID \cdot SD \cdot RT \cdot ART \geq N(OID, SD, RT) wOpp \cdot OID$$

The variables yOpp.OID.SD.RT.ART and wOpp.OID were described above. N(OID, SD, RT) represents the number of sleeping rooms associated with demand/opportunity OID for stay date DS and room type RT.

Using the values of SD, RT, and OID from Table 12, and ART≧RT:

GpRmPr.ATT.0.0.Def: yOpp.ATT.0.0.0_yOpp.ATT.0.0.1+
  yOpp.ATF.0.0.2−4wOpp.ATT≦0.
GpRmPr.ATT.1.1.Def: yOpp.ATT.1.1.1+yOpp.AT.1.1.2−
  8wOpp.ATT≧0
GpRmPr.CSCO.0.0.Def:yOpp.CSCO.0.0.0+yOpp.C-
  SCO.0.0.1+yOpp.CSCO.0.0.2−5wOpp.CSCO≧0
GpRmPr.IBM.0.0.Def: yOpp.IBM.0.0.0+yOpp.IBM.0.0.1+
  yOpp.IBM.0.0.2−3wOpp.IBM≧0
GpRmPr.IBM.1.1.Def: yOpp.IBM.1.1.1+yOpp.IBM.1.1.2−
  7wOpp.IBM≧0

In step 340, the space constraints spc.DP.SS.Def are determined. The spc.DP.SS.Def constraints ensure that the same function space is not used more than once during a given day part. The spc.DP.SS constraints are defined as:

$$spc \cdot DP \cdot SS \cdot Def: \sum_{SS \in C(SS)} sscfu \cdot DP \cdot SS \leq 1 \ \forall \ SS, DP$$

Or written another way:

$$\sum_{SS \in C(SS)} sscfu \cdot DP \cdot SS \leq 1 \ \forall \ SS, DP$$

sscfu.DP.SS. represents whether indivisible specific space (SS) is being used during a specific day part (DP), for all specific space types (SST) and day parts (DP). C(SS) represents a set of all spaces that conflict with space SS. (I.e., given the following indivisible specific space A, B, C with basic configurations AB, BC, ABC here is a list of all sets. C(A)={A, AB, ABC}; C(B)={B, AB, BC, ABC}; C(C)={C, BC, ABC}.)

In the example below, the day part is 0, 1, 2, or 3 (each representing 6 hours: thus day part (DP) 0 represents 12 AM-6 AM; day part (DP) 1 represents 6 AM to 12 PM; day part (DP) 2 represents 12 PM to 6 PM; day part (DP) 3 represents 6 PM to 12 PM). SS is the indivisible specific space (space code), as shown in Table 9. Thus:

spc.0.A1.Def: sscfu.0.A1+sscfu.0.AB1+sscfu.0.BALL1≦1
spc.0.A2.Def: sscfu.0.A2+sscfu.0.0.AB2+sscfu.0.BALL2≦1
spc.0.B1.Def: sscfu.0.AB1+sscfu.0.BALL1+sscfu.0.B1+sscfu.0.BC1≦1
spc.0.B2.Def: sscfu.0.AB2+sscfu.0.BALL2+sscfu.0.B2+sscfu.0.BC2≦1
spc.0.C1.Def: sscfu.0.BALL1+sscfu.0.BC1+sscfu.0.C1≦1
spc.0.C2.Def: sscfu.0.BALL2+sscfu.0.BC2+sscfu.0.C2≦1
spc.1.A1.Def: sscfu.1.A1+sscfu.1.AB1+sscfu.1.BALL1≦1
spc.1.A2.Def: sscfu.1.A2+sscfu.1.AB2+sscfu.1.BALL2≦1
spc.1.B1.Def: sscfu.1.AB1+sscfu.1.BALL 1+sscfu.1.B1+sscfu.1.BC 1≦1
spc.1.B2.Def: sscfu.1.AB2+sscfu.1.BALL2+sscfu.1.B2+sscfu.1.BC2≦1
spc.1.C1.Def: sscfu.1.BALL1+sscfu.1.BC1+sscfu.1.C1≦1
spc.1.C2.Def: sscfu.1.BALL2+sscfu.1.BC2+sscfu.1.C2≦1
spc.2.A1.Def: sscfu.2.A1+sscfu.2.AB1+sscfu.2.BALL1≦1
spc.2.A2.Def: sscfu.2.A2+sscfu.2.AB2+sscfu.2.BALL2≦1
spc.2.B1.Def: sscfu.2.AB1+sscfu.2.BALL1+sscfu.2.B1+sscfu.2.BC1≦1
spc.2.B2.Def: sscfu.2.AB2+sscfu.2.BALL2+sscfu.2.B2+sscfu.2.BC2≦1
spc.2.C1.Def: sscfu.2.BALL1+sscfu.2.BC1+sscfu.2.C1≦1
spc.2.C2.Def: sscfu.2.BALL2+sscfu.2.BC2+sscfu.2.C2≦1
spc.3.A1.Def: sscfu.3.A1+sscfu.3.AB1+sscfu.3.BALL1≦1
spc.3.A2.Def: sscfu.3.A2+sscfu.3.AB2+sscfu.3.BALL2≦1
spc.3.B1.Def: sscfu.3.AB1+sscfu.3.BALL1+sscfu.3.B1+sscfu.3.BC1≦1
spc.3.B2.Def: sscfu.3.AB2+sscfu.3.BALL2+sscfu.3.B2+sscfu.3.BC2≦1
spc.3.C1.Def: sscfu.3.BALL1+sscfu.3.BC1+sscfu.3.C1≦1
spc.3.C2.Def: sscfu.3.BALL2+sscfu.3.BC2+sscfu.3.C2≦1

In step 345, the assigned function space constraints tsa.DP.TST.Def are determined. The target space availability (tsa) variables tsa.DP.TST express the indivisible space usage, and the assigned function space constraints tsa.DP.TST.Def ensure that the area of the function space(s) assigned to a group demand for a function space is at least as great as the amount of function space area requested. The assigned function space constraints are defined as:

$$tsa \cdot DP \cdot TST \cdot Def: \sum_{SS \in C(TST)} sscfu \cdot DP \cdot SS - tsa \cdot DP \cdot TST = 0 \ \forall \ T \ ST, DP$$

Or written another way:

$$tsa \cdot DP \cdot TST = \sum_{SS \in C(TST)} sscfu \cdot DP \cdot SS$$

tsa.DP.TST represents the target space available of a given target space type (target space type is also referred to as function space category). There are NDP X NTST such variables. NDP represents the number of day parts. NTST represents the number of target space types.

sscfu.DP.SS represents whether indivisible specific space SS is being used during day part P. SS is the indivisible specific space (space code), as shown in Table 9. TST is the target space type (space category) from Table 9. SS(TST) is the set of all indivisible specific spaces that produce the given target space type. DP is the day part and is 0, 1, 2, or 3 (each representing 6 hours as described above). Thus:

tsa.0.0.Def: sscfu.0.A1+sscfu.0.A2+sscfu.0.B1−tsa.0.0=0
tsa.0.1.Def: sscfu.0.AB1+sscfu.0.C1−tsa.0.1=0
tsa.0.2.Def: sscfu.0.B2−tsa.0.2=0
tsa.0.3.Def: sscfu.0.BC1+sscfu.0.C2−tsa.0.3=0
tsa.0.4.Def: sscfu.0.AB2−tsa.0.4=0
tsa.0.5.Def: sscfu.0.BALL1−tsa.0.5=0
tsa.0.6.Def: sscfu.0.BC2−tsa.0.6=0
tsa.0.7.Def: sscfu.0.BALL2−tsa.0.7=0
tsa.0.POOL.Def: sscfu.0.POOL−tsa.0.POOL=0
tsa.1.0.Def: sscfu.1.A1+sscfu.1.A2+sscfu.1.B1−tsa.1.0=0
tsa.1.1.Def: sscfu.1.AB1+sscfu.1.C1−tsa.1.1=0
tsa.1.2.Def: sscfu.1.B2−tsa.1.2=0
tsa.1.3.Def: sscfu.1.BC1+sscfu.1.C2−tsa.1.3=0
tsa.1.4.Def: sscfu.1.AB2−tsa.1.4=0
tsa.1.5.Def: sscfu.1.BALL1−tsa.1.5=0
tsa.1.6.Def: sscfu.1.BC2−tsa.1.6=0
tsa.1.7.Def: sscfu.1.BALL2−tsa.1.7=0
tsa.1.POOL.Def: −tsa.1.POOL+sscfu.1.POOL=0
tsa.2.0.Def: sscfu.2.A1+sscfu.2.A2+sscfu.2.B1−tsa.2.0=0
tsa.2.1.Def: sscfu.2.AB 1+sscfu.2.C1−tsa.2.1=0
tsa.2.2.Def: sscfu.2.B2−tsa.2.2=0
tsa.2.3.Def: sscfu.2.BC1+sscfu.2.C2−tsa.2.3=0
tsa.2.4.Def: sscfu.2.AB2−tsa.2.4=0
tsa.2.5.Def: sscfu.2.BALL1−tsa.2.5=0
tsa.2.6.Def: sscfu.2.BC2−tsa.2.6=0
tsa.2.7.Def: sscfu.2.BALL2−tsa.2.7=0
tsa.2.POOL.Def: sscfu.2.POOL−tsa.2.POOL=0
tsa.3.0.Def: sscfu.3.A1+sscfu.3.A2+sscfu.3.B1−tsa.3.0=0
tsa.3.1.Def: sscfu.3.AB1+sscfu.3.C1−tsa.3.1=0
tsa.3.2.Def: sscfu.3.B2−tsa.3.2=0
tsa.3.3.Def: sscfu.3.BC1+sscfu.3.C2−tsa.3.3=0
tsa.3.4.Def: sscfu.3.AB2−tsa.3.4=0
tsa.3.5.Def: sscfu.3.BALL1−tsa.3.5=0
tsa.3.6.Def: sscfu.3.BC2−tsa.3.6=0
tsa.3.7.Def: sscfu.3.BALL2−tsa.3.7=0
tsa.3.POOL.Def: sscfu.3.POOL−tsa.3.POOL=0

In step 350, the upgraded function space constraint tsu.DP.TST.Def is determined. The upgraded function space constraint ensures that upgrades for function space are given in an efficient manner (e.g., when a choice of a smaller room and a larger room is available for an upgrade, a smaller room is assigned to a group who needs the smaller room and a larger room is assigned to a group who needs the larger room). The upgraded function space is defined as:

tsu.DP.TST.Def:

$$\sum_{OID} N(OID, DP, TST) wOpp \cdot OID + \sum_{RTST|ATST=TST} upg \cdot DP \cdot RTST \cdot ATST -$$
$$\sum_{ATST|RTST=TST} upg \cdot DP \cdot RTST \cdot ATST - tsa \cdot DP \cdot TST \leq 0$$

Or written another way:

$$\sum_{OID} N(OID, DP, TST) wOpp \cdot OID + \sum_{RTST|ATST=TST} upg \cdot DP \cdot RTST \cdot ATST -$$
$$\sum_{ATST|RTST=TST} upg \cdot DP \cdot RTST \cdot ATST \leq tsa \cdot DP \cdot TST$$

N(OID, DP, TST) represents the number of target spaces of target space type (TST) demanded by opportunity ID (OID) during day part (DP). wOpp.OID represents whether an opportunity is accepted or turned down (There are NOID such variables, where NOID is the number of opportunities.) tsa.DP.TST represents the target space available of a given target space type (i.e., function space category). upg.DP.RTST.ATST represents the upgrades from the requested target space type to the assigned target space type. RTST represents the requested target space type and ATST represents the assigned target space type.

DP is the day part and is 0, 1, 2, or 3 (each representing 6 hours, as explained above). TST is the target space type (space category) from Table 9. OID is the opportunity ID from Table 11. Thus:

tsu.0.0.Def:−upg.0.0.1−tsa.0.0≦0
tsu.0.1.Def: upg.0.0.1−upg.0.1.2−tsa.0.1≦0
tsu.0.2.Def: upg.0.1.2−upg.0.2.3−tsa.0.2≦0
tsu.0.3.Def: upg.0.2.3−upg.0.3.4−tsa.0.3≦0
tsu.0.4.Def: upg.0.3.4−upg.0.4.5−tsa.0.4≦0
tsu.0.5.Def: upg.0.4.5−upg.0.5.6−tsa.0.5≦0
tsu.0.6.Def: upg.0.5.6−upg.0.6.7−tsa.0.6≦0
tsu.0.7.Def: upg.0.6.7−tsa.0.7≦0
tsu.0.POOL.Def: wOpp.IBM−tsa.0.POOL≦0
tsu.1.0.Def: −upg.1.0.1−tsa.1.0≦0
tsu.1.1.Def: upg.1.0.1−upg.1.1.2−tsa.1.1≦0
tsu.1.2.Def: upg.1.1.2−upg.1.2.3−tsa.1.2≦0
tsu.1.3.Def: wOpp.ATT+upg.1.2.3−upg.1.3.4−tsa.1.3≦0
tsu.1.4.Def: upg.1.3.4−upg.1.4.5−tsa.1.4≦0
tsu.1.5.Def: upg.1.4.5−upg.1.5.6−tsa.1.5≦0
tsu.1.6.Def: upg.1.5.6−upg.1.6.7−tsa.1.6≦0
tsu.1.7.Def: upg.1.6.7−tsa.1.7≦0
tsu.1.POOL.Def: −tsa.1.POOL≦0
tsu.2.0.Def: −upg.2.0.1−tsa.2.0≦0
tsu.2.1.Def: upg.2.0.1−upg.2.1.2−tsa.2.1≦0
tsu.2.2.Def: wOpp.CSCO+wOpp.IBM+upg.2.1.2−upg.2.2.3−tsa.2.2≦0
tsu.2.3.Def: wOpp.ATT+upg.2.2.3−upg.2.3.4−−tsa.2.3≦0
tsu.2.4.Def: upg.2.3.4−upg.2.4.5−tsa.2.4≦0
tsu.2.5.Def: upg.2.4.5−upg.2.5.6−tsa.2.5≦0
tsu.2.6.Def: upg.2.5.6−upg.2.6.7−tsa.2.6≦0
tsu.2.7.Def: upg.2.6.7−tsa.2.7≦0
tsu.2.POOL.Def: −tsa.2.POOL≦0
tsu.3.0.Def: −upg.3.0.1−tsa.3.0≦0
tsu.3.1.Def: upg.3.0.1−upg.3.1.2−tsa.3.1≦0
tsu.3.2.Def: upg.3.1.2−upg.3.2.3−tsa.3.2≦0
tsu.3.3.Def: upg.3.2.3−upg.3.3.4−tsa.3.3≦0
tsu.3.4.Def: upg.3.3.4−upg.3.4.5−tsa.3.4≦0
tsu.3.5.Def: upg.3.4.5−upg.3.5.6−tsa.3.5≦0
tsu.3.6.Def: upg.3.5.6−upg.3.6.7−tsa.3.6≦0
tsu.3.7.Def: upg.3.6.7−tsa.3.7≦0
tsu.3.POOL: −tsa.3.POOL≦0

Determine Bounds

Figure 4:
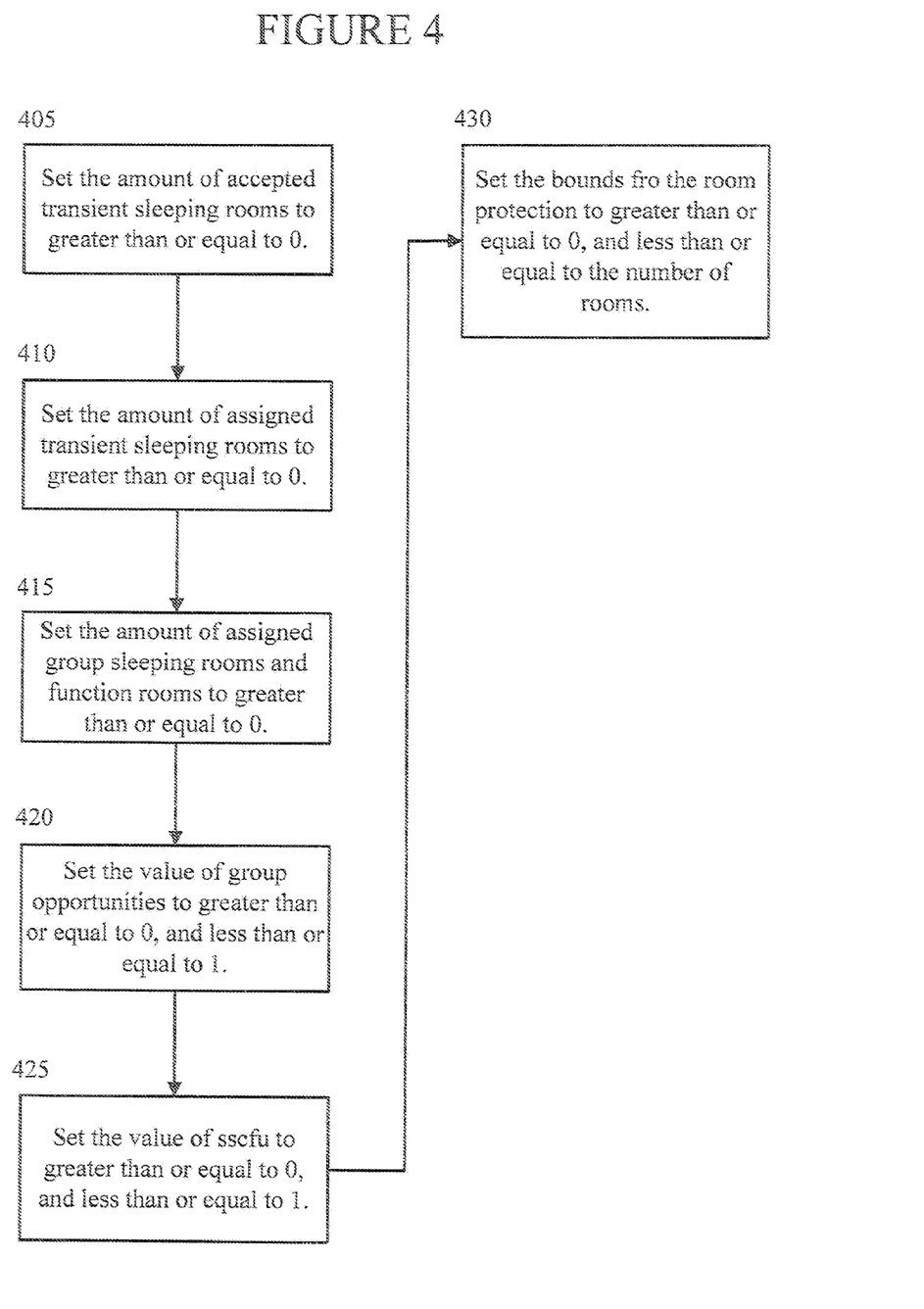
FIG. 4 is a flowchart illustrating various bounds and how the various bounds are determined.

FIG. 4 is a flowchart illustrating various bounds and how the various bounds are determined. In step 405, the bound for the amount of transient rooms accepted is set.

0≦x.AD (i).LS(i).RC (i).RT (i)

Thus, for example:

0≦x.0.2.0.0
0≦x.1.0.0.1
0≦x.2.0.0.1
0≦x.2.0.0.2

In step 410, the bound for the amount of transient rooms assigned is set.

0≦y.AD(i).LS(i).RC(i).RT(i).ART

Thus, for example:

0≦y.0.2.0.0.0
0≦y.0.2.0.0.1
0≦y.0.2.0.0.2

$0 \leq y.1.0.0.1.1$
$0 \leq y.1.0.0.1.2$
$0 \leq y.2.0.0.1.1$
$0 \leq y.2.0.0.1.2$
$0 \leq y.2.0.0.2.2$ In step 415, the bound for the amount of assigned group rooms is set.

$0 \leq yOpp.OID.SD.RT.ART$

Thus, for example:

$0 \leq yOpp.ATT.0.0.0$
$0 \leq yOpp.CSCO.0.0.0$
$0 \leq yOpp.IBM.0.0.0$
$0 \leq yOpp.ATT.0.0.1$
$0 \leq yOpp.CSCO.0.0.1$
$0 \leq yOpp.IBM.0.0.1$
$0 \leq yOpp.ATT.0.0.2$
$0 \leq yOpp.CSCO.0.0.2$
$0 \leq yOpp.IBM.0.0.2$
$0 \leq yOpp.ATT.1.1.1$
$0 \leq yOpp.IBM.1.1.1$
$0 \leq yOpp.ATT.1.1.2$
$0 \leq yOpp.IBM.1.1.2$ In step 420, the bounds for the wOpp.OID are set. In this case the value for wOpp.OID is either 0 or 1:

$0 \leq wOpp.OID \leq 1$

Thus, for example:

$0 \leq wOpp.ATT \leq 1$
$0 \leq wOpp.CSCO \leq 1$
$0 \leq wOpp.IBM \leq 1$

In step 425, the bounds for sscfu.DP.SS are set. sscfu.DP.SS is either 0 or 1.

$0 \leq sscfu.DP.SS \leq 1$

Thus, for example:

$0 \leq sscfu.0.A1 \leq 1$
$0 \leq sscfu.0.AB1 \leq 1$
$0 \leq sscfu.0.BALL1 \leq 1$
$0 \leq sscfu.0.A2 \leq 1$
$0 \leq sscfu.0.AB2 \leq 1$
$0 \leq sscfu.0.BALL2 \leq 1$
$0 \leq sscfu.0.B1 \leq 1$
$0 \leq sscfu.0.BC1 \leq 1$
$0 \leq sscfu.0.B2 \leq 1$
$0 \leq sscfu.0.BC2 \leq 1$
$0 \leq sscfu.0.C1 \leq 1$
$0 \leq sscfu.O.C2 \leq 1$
$0 \leq sscfu.0.POOL \leq 1$
$0 \leq sscfu.1.A1 \leq 1$
$0 \leq sscfu.1.AB1 \leq 1$
$0 \leq sscfu.1.BALL1 \leq 1$
$0 \leq sscfu.1.A2 \leq 1$
$0 \leq sscfu.1.AB2 \leq 1$
$0 \leq sscfu.1.BALL2 \leq 1$
$0 \leq sscfu.1.B1 \leq 1$
$0 \leq sscfu.1.BC1 \leq 1$
$0 \leq sscfu.1.B2 \leq 1$
$0 \leq sscfu.1.BC2 \leq 1$
$0 \leq sscfu.1.C1 \leq 1$
$0 \leq sscfu.1.C2 \leq 1$
$0 \leq sscfu.1.POOL \leq 1$
$0 \leq sscfu.2.A1 \leq 1$
$0 \leq sscfu.2.AB1 \leq 1$
$0 \leq sscfu.2.BALL1 \leq 1$
$0 \leq sscfu.2.A2 \leq 1$
$0 \leq sscfu.2.AB2 \leq 1$
$0 \leq sscfu.2.BALL2 \leq 1$
$0 \leq sscfu.2.B1 \leq 1$
$0 \leq sscfu.2.BC1 \leq 1$
$0 \leq sscfu.2.B2 \leq 1$
$0 \leq sscfu.2.BC2 \leq 1$
$0 \leq sscfu.2.C1 \leq 1$
$0 \leq sscfu.2.C2 \leq 1$
$0 \leq sscfu.2.POOL \leq 1$
$0 \leq sscfu.3.A1 \leq 1$
$0 \leq sscfu.3.AB1 \leq 1$
$0 \leq sscfu.3.BALL1 \leq 1$
$0 \leq sscfu.3.A2 \leq 1$
$0 \leq sscfu.3.AB2 \leq 1$
$0 \leq sscfu.3.BALL2 \leq 1$
$0 \leq sscfu.3.B1 \leq 1$
$0 \leq sscfu.3.BC1 \leq 1$
$0 \leq sscfu.3.B2 \leq 1$
$0 \leq sscfu.3.BC2 \leq 1$
$0 \leq sscfu.3.C1 \leq 1$
$0 \leq sscfu.3.C2 \leq 1$
$0 \leq sscfu.3.POOL \leq 1$ In step 430, the bounds for the room protection are set:

$0 \leq Rm(SD,Rt)$.

Thus, for example:

$0 \leq RmPr.0.0 \leq 21$
$0 \leq RmPr.0.1 \leq 22$
$0 \leq RmPr1.0 \leq 23$
$0 \leq RmPr1.1 \leq 24$
$0 \leq RmPr.2.0 \leq 25$
$0 \leq RmPr.2.1 \leq 26$ Conclusion While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above-described exemplary embodiments, but should be defined only in accordance with the following claims and their equivalents.

In addition, it should be understood that the Figures and Tables illustrated in the attachments, which highlight the functionality and advantages of the present invention, are presented for example purposes only. The architecture of the present invention is sufficiently flexible and configurable, such that it may be utilized (and navigated) in ways other than that shown in the accompanying Figures.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

TABLE 1

Description of Subscripts

| Subscript | Description |
|---|---|
| AD | Arrival Date |
| LS | Length of Stay |
| RC | Rate Category |
| RT | Room Type |
| ART | Assigned Room Type |
| TRT | Target Room Type |
| DP | Day Part |
| OID | Opportunity ID |
| SSN | Source Space Name |
| TST | Target Space Type |
| SS | Specific Space |
| SD | Stay Date |

TABLE 2

Number and Types of Variables

| Variable | Number | Type |
|---|---|---|
| x.AD(i).LS(i).RC(i).RT (i) | I | Continuous |
| y.AD(i).LS(i).RC(i).RT (i).ART | $\sum_i (NRT - RT(i) + 1)$ | Continuous |
| TrRev | 1 | Continuous |
| UpCst | 1 | Continuous |
| GrRev | 1 | Continuous |
| yOpp.OID.SD.RT.ART | $\sum_{OID,SD,RT \mid N(OID,SD,RT)>0} (NRT - RT)$ | Continuous |
| RmPr.SD.RT | NSD × NRT) | Continuous |
| sscfu.DP.SS | NDP × NSS | Binary |
| tsa.DP.T ST | NDP × NTST | Continuous |
| wOpp.OID | NOID | Binary |
| upg.DP.RT ST.AT ST | NT ST − 1 | Continuous |

TABLE 3

Number of Constraints

| Constraint | Number |
|---|---|
| xUbCon.i | I |
| trUpg.AD(i).LS(i).RC(i).RT(i) | I |
| TrRevDef | 1 |
| UpCstDef | 1 |
| RmPr.SD.RT.Def | NSD × NRT |
| GpRmPr.OID.SD.RT.Def | $\sum_{OID,SD,RT \mid N(OID,SD,RT)>0} 1$ |
| GrRevDef | 1 |
| spc.DP.SS.Def | NDP × NSS |
| tsa.DP.TST.Def | NDP × NTST |
| tsu.DP.TST.Def | NDP × NTST |

TABLE 4

Parameters

| Arr. Dates | Rate Cat. | Rm Types | LOS | Prop Code | Post Date | Brand | Rate Cat. |
|---|---|---|---|---|---|---|---|
| 3 | 1 | 3 | 3 | HOTEL | 37718 | FS | A |

TABLE 5

Supply Information

| Room Type (RT) | Stay Date (SD) | Rooms (Number of Rooms Available) |
|---|---|---|
| 0 | 0 | 20 |
| 1 | 0 | 20 |
| 2 | 0 | 20 |
| 0 | 1 | 20 |
| 1 | 1 | 19 |
| 2 | 1 | 20 |
| 0 | 2 | 20 |
| 1 | 2 | 20 |
| 2 | 2 | 18 |

TABLE 6

Transient Demand Information

| Demand (i) | Arrival Date (AD) | Length of Stay (LS) | Rate Category (RC) | Room Type (RT) | Number of Rooms Requested [N(i)] | Rate |
|---|---|---|---|---|---|---|
| 1 | 0 | 2 | 0 | 0 | 3 | 100 |
| 2 | 1 | 0 | 0 | 1 | 4 | 100 |
| 3 | 2 | 0 | 1 | 1 | 5 | 120 |
| 4 | 2 | 0 | 2 | 2 | 6 | 150 |

TABLE 7

Target Space Information

| Property Code | Target Space Type | Area |
|---|---|---|
| HOTEL | 0 | 100 |
| HOTEL | 1 | 200 |
| HOTEL | 2 | 250 |
| HOTEL | 3 | 300 |
| HOTEL | 4 | 350 |
| HOTEL | 5 | 400 |
| HOTEL | 6 | 550 |
| HOTEL | 7 | 650 |
| HOTEL | POOL | 1000 |

TABLE 8

Function Space Upgrade Information

| Property Code | Upgraded Target Space Type | Requested Target Space Type |
|---|---|---|
| HOTEL | 1 | 0 |
| HOTEL | 2 | 1 |
| HOTEL | 3 | 2 |
| HOTEL | 4 | 3 |
| HOTEL | 5 | 4 |
| HOTEL | 6 | 5 |
| HOTEL | 7 | 6 |

TABLE 9

Function Space Category Information

| Space Code | Space Category (Target Space Type) | Space Type | Area (sq. ft.) |
|---|---|---|---|
| A1 | 0 | FRM | 100 |
| A2 | 0 | FRM | 100 |
| AB1 | 1 | FRM | 200 |
| AB2 | 4 | FRM | 350 |
| B1 | 0 | FRM | 100 |
| B2 | 2 | FRM | 250 |
| BALL1 | 5 | FRM | 400 |
| BALL2 | 7 | FRM | 650 |
| BC1 | 3 | FRM | 300 |
| BC2 | 6 | FRM | 550 |
| C1 | 1 | FRM | 200 |
| C2 | 3 | FRM | 300 |
| POOL | POOL | ALT | 1000 |

TABLE 10

Function Space Structure Information

| Property Code | Indivisible Space Code | Configured Space Codes |
|---|---|---|
| HOTEL | A1 | AB1 BALL1 |
| HOTEL | A2 | AB2 BALL2 |
| HOTEL | B1 | AB1 BALL1 BC1 |
| HOTEL | B2 | AB2 BALL2 BC2 |
| HOTEL | C1 | BALL1 BC1 |
| HOTEL | C2 | BALL2 BC2 |

TABLE 11

Opportunity Information

| Property Code | Opportunity ID | Revenue | Profit | Is Actual | Is StayThru |
|---|---|---|---|---|---|
| HOTEL | IBM | 2000 | 1053 | 1 | 0 |
| HOTEL | ATT | 2001 | 1052 | 1 | 0 |
| HOTEL | CSCO | 2002 | 1051 | 0 | 0 |

TABLE 12

Opportunity Sleeping Demand Information

| Property Code | Opportunity ID | Room Type | Stay Date | Demand |
|---|---|---|---|---|
| HOTEL | IBM | 0 | 0 | 3 |
| HOTEL | IBM | 1 | 1 | 7 |
| HOTEL | ATT | 0 | 0 | 4 |
| HOTEL | ATT | 1 | 1 | 8 |
| HOTEL | CSCO | 0 | 0 | 5 |

TABLE 13

Opportunity Function Space Demand

| Prop Code | Opp ID | Tgt Space Type | St. Day | St. Hr | End Day | End Hr | Demand |
|---|---|---|---|---|---|---|---|
| HOTEL | IBM | POOL | 0 | 8 | 0 | 9 | 1 |
| HOTEL | ATT | 3 | 0 | 13 | 0 | 15 | 1 |
| HOTEL | CSCO | 2 | 0 | 14 | 0 | 16 | 1 |
| HOTEL | IBM | 2 | 0 | 14 | 0 | 16 | 1 |

What is claimed is:

1. A computerized system for calculating a potential past optimum yield for a configurable space, comprising:
   a processor;
   a memory, the memory connected to the processor, wherein the processor is configured for:
   performing processing associated with obtaining a set of past demands including both past transient demands and past group demands for the configurable space for a designated time period, the configurable space comprising transient individual space, group individual space, and group function space; the set of past demands comprising information on arrival date, length of stay, rate category and room type requests for the transient individual space and group individual space; and
   performing processing, associated with calculating, by a processor, a potential past optimum yield that includes both a transient yield from the transient individual space, and a group yield from the group individual space and the group function space, wherein the performing processing associated with calculating comprises:
   performing processing associated with determining constraints related to the configurable space;
   performing processing associated with determining bounds related to the configurable space;
   performing processing associated with identifying which past demands for the configurable space should have been accepted in order to optimize the potential past optimum yield, subject to the constraints and the bounds; and
   performing processing associated with determining the potential past optimum yield utilizing the set of past demands;
   performing processing associated with determining a upper bound transient constraint, the upper bound transient constraint ensuring that more transient individual space than available is not assigned, wherein the upper bound transient constraint is x.AD(i),LS(i).RC(i).RT(i) $\leq$ N(i), and wherein i is a transient demand, xAD(i).LS (i).RC(i).RT(i) is an integer value representing a number of demands i that are accepted, AD is an arrival date, LS is a length of stay, RC is a rate category, RT is a room type, and N(i) is a number of sleeping rooms associated with demand i;
   wherein the yield that could have been realized for a given demand amount had optimal decisions on whether to accept or deny a demand been made is compared to yield actually realized.

2. The system of claim 1, wherein:
   the identifying is performed using a mixed integer linear programming technique;
   the potential past optimum yield comprises revenue;
   the potential past optimum yield comprises profit; or
   the group function space is configured; or any combination thereof.

3. The system of claim 1, further comprising:
assigning a small value as a cost of a transient upgrade, and including the small value in the transient yield;
comparing a actual total yield to the potential past optimum yield; or
determining a configuration of the configurable space that satisfies the set of past demands; or any combination thereof.

4. A computerized system for calculating a potential past optimum yield for a configurable space, comprising:
a processor;
a memory, the memory connected to the processor, wherein the processor is configured for:
performing processing associated with obtaining a set of past demands including both past transient demands and past group demands for the configurable space for a designated time period, the configurable space comprising transient individual space, group individual space, and group function space; the set of past demands comprising information on arrival date, length of stay, rate category and room type requests for the transient individual space and group individual space; and
performing processing associated with calculating, by a processor, a potential past optimum yield that includes both a transient yield from the transient individual space, and a group yield from the group individual space and the group function space, wherein the performing processing associated with calculating comprises:
performing processing associated with determining constraints related to the configurable space;
performing processing associated with determining bounds related to the configurable space;
performing processing associated with identifying which past demands for the configurable space should have been accepted in order to optimize the potential past optimum yield, subject to the constraints and the bounds; and
performing processing associated with determining the potential past optimum yield utilizing the set of past demands;
performing processing associated with determining a transient upgrade constraint that ensures that an assigned transient individual space is at least as high as a requested transient individual space, wherein the transient upgrade constraint is:

$$\sum_{ART \geq RT(i)} y \cdot AD(i) \cdot LS(i) \cdot RC(i) \cdot RT(i) \cdot ART \geq x \cdot AD(i) \cdot LS(i) \cdot RC(i) \cdot RT(i)$$

and wherein i is a transient demand, y.AD(i).LS(i).RC(i).RT(i).ART are room allocation variables that represent a number of rooms of allocated room type ART that are allocated to each transient demand i, xAD(i).LS(i).RC(i).RT(i) is an integer value representing a number of demands i that are accepted, AD is an arrival date, LS is a length of stay, RC is a rate category, and RT is a room type;
wherein the yield that could have been realized for a given demand amount had optimal decisions on whether to accept or deny a demand been made is compared to yield actually realized.

5. The system of claim 4, wherein:
the identifying is performed using a mixed integer linear programming technique;
the potential past optimum yield comprises revenue;
the potential past optimum yield comprises profit; or
the group function space is configured; or any combination thereof.

6. The system of claim 4, further comprising:
assigning a small value as a cost of a transient upgrade, and including the small value in the transient yield;
comparing a actual total yield to the potential past optimum yield; or
determining a configuration of the configurable space that satisfies the set of past demands; or any combination thereof.

7. A computerized system for calculating a potential past optimum yield for a configurable space, comprising:
a processor;
a memory, the memory connected to the processor, wherein the processor is configured for:
performing processing associated with obtaining a set of past demands including both past transient demands and past group demands for the configurable space for a designated time period, the configurable space comprising transient individual space, group individual space, and group function space; the set of past demands comprising information on arrival date, length of stay, rate category and room type requests for the transient individual space and group individual space; and
performing processing associated with calculating, by a processor, a potential past optimum yield that includes both a transient yield from the transient individual space, and a group yield from the group individual space and the group function space, wherein the performing processing associated with calculating comprises:
performing processing associated with determining constraints related to the configurable space;
performing processing associated with determining bounds related to the configurable space;
performing processing associated with identifying which past demands for the configurable space should have been accepted in order to optimize the potential past optimum yield, subject to the constraints and the bounds; and
performing processing associated with determining the potential past optimum yield utilizing the set of past demands;
performing processing associated with determining a transient yield constraint, incorporating transient individual space yield information;
wherein the transient yield constraint is $$\sum_i Y(i)x \cdot AD(i) \cdot LS(i) \cdot RC(i) \cdot RT(i)$$

wherein Y(i) is the yield associated with transient demand i, AD is an arrival date, LS is a length of stay, RC is a rate category, and RT is a room type;
wherein the yield that could have been realized for a given demand amount had optimal decisions on whether to accept or deny a demand been made is compared to yield actually realized.

8. The system of claim 7, wherein:
the identifying is performed using a mixed integer linear programming technique;
the potential past optimum yield comprises revenue;
the potential past optimum yield comprises profit; or
the group function space is configured; or any combination thereof.

9. The system of claim 7, further comprising:
assigning a small value as a cost of a transient upgrade, and including the small value in the transient yield;
comparing a actual total yield to the potential past optimum yield; or
determining a configuration of the configurable space that satisfies the set of past demands; or any combination thereof.

10. A computerized system for calculating a potential past optimum yield for a configurable space, comprising:
a processor;
a memory, the memory connected to the processor, wherein the processor is configured for:
performing processing associated with obtaining a set of past demands including both past transient demands and past group demands for the configurable space for a designated time period, the configurable space comprising transient individual space, group individual space, and group function space; the set of past demands comprising information on arrival date, length of stay, rate category and room type requests for the transient individual space and group individual space; and
performing processing associated with calculating, by a processor, a potential past optimum yield that includes both a transient yield from the transient individual space, and a group yield from the group individual space and the group function space, wherein the performing processing associated with calculating comprises:
performing processing associated with determining constraints related to the configurable space;
performing processing associated with determining bounds related to the configurable space;
performing processing associated with identifying which past demands for the configurable space should have been accepted in order to optimize the potential past optimum yield, subject to the constraints and the bounds; and
performing processing associated with determining the potential past optimum yield utilizing the set of past demands;
performing processing associated with assigning a small value as a cost of a transient upgrade, and including the small value in the transient yield;
performing processing associated with determining a total transient upgrade constraint that comprises a total number of individual spaces where an upgrade was assigned, wherein the total transient upgrade constraint is $$\sum_i \sum_{ART>RT(i)} Y(i)x \cdot AD(i) \cdot LS(i) \cdot RC(i) \cdot RT(i) \cdot ART$$

wherein Y(i) is a yield associated with transient demand i, xAD(i).LS(i).RC(i).RT(i) is an integer value representing a number of demands i that are accepted, AD is an arrival date, LS is a length of stay, RC is a rate category, RT is a room type, and ART is an allocated room type;
wherein the yield that could have been realized for a given demand amount had optimal decisions on whether to accept or deny a demand been made is compared to yield actually realized.

11. The system of claim 10, wherein:
the identifying is performed using a mixed integer linear programming technique;
the potential past optimum yield comprises revenue;
the potential past optimum yield comprises profit; or the group function space is configured; or any combination thereof.

12. The system of claim 10, further comprising:
assigning a small value as a cost of a transient upgrade, and including the small value in the transient yield;
comparing a actual total yield to the potential past optimum yield; or
determining a configuration of the configurable space that satisfies the set of past demands; or any combination thereof.

13. A computerized system for calculating a potential past optimum yield for a configurable space, comprising:
a processor;
a memory, the memory connected to the processor, wherein the processor is configured for:
performing processing associated with obtaining a set of past demands including both past transient demands and past group demands for the configurable space for a designated time period, the configurable space comprising transient individual space, group individual space, and group function space; the set of past demands comprising information on arrival date, length of stay, rate category and room type requests for the transient individual space and group individual space; and
performing processing associated with calculating, by a processor, a potential past optimum yield that includes both a transient yield from the transient individual space, and a group yield from the group individual space and the group function space, wherein the performing processing associated with calculating comprises:
performing processing associated with determining constraints related to the configurable space;
performing processing associated with determining bounds related to the configurable space;
performing processing associated with identifying which past demands for the configurable space should have been accepted in order to optimize the potential past optimum yield, subject to the constraints and the bounds; and
performing processing associated with determining the potential past optimum yield utilizing the set of past demands;
performing processing associated with determining a space protection constraint that ensures that more individual space and function space than available is not assigned, wherein the space protection constraint is $$\sum_{\substack{i \mid AD(i) \leq SD(i), AD(i)+ \\ LS(i) \geq SD, ART=RT}} y \cdot AD(i) \cdot LS(i) \cdot RC(i) \cdot RT(i) \cdot ART +$$

$$\sum_{OID} \sum_{rt \mid ART(rt)=RT} yOpp \cdot OID \cdot SD \cdot RT \cdot ART(RT)$$

and wherein i is a transient demand, y.AD(i).LS(i).RC(i).RT(i).ART are room allocation variables that represent a number of rooms of allocated room type ART that are allocated to each transient demand i, yOpp.OID.SD.RT.ART(RT) represents a number of rooms of allocated room type ART that are allocated to fill each accepted group demand OID, AD is an arrival date, LS is a length of stay, RC is a rate category, and RT is a room type;
wherein the yield that could have been realized for a given demand amount had optimal decisions on whether to accept or deny a demand been made is compared to yield actually realized.

14. The system of claim 13, wherein;
the identifying is performed using a mixed integer linear programming technique;
the potential past optimum yield comprises revenue;
the potential past optimum yield comprises profit; or
the group function space is configured; or any combination thereof.

15. The system of claim 13, further comprising:
assigning a small value as a cost of a transient upgrade, and including the small value in the transient yield;
comparing a actual total yield to the potential past optimum yield; or
determining a configuration of the configurable space that satisfies the set of past demands; or any combination thereof.

16. A computerized method for calculating a potential past optimum yield for a configurable space, comprising:
a processor;
a memory, the memory connected to the processor, wherein the processor is configured for:
performing processing associated with obtaining a set of past demands including both past transient demands and past group demands for the configurable space for a designated time period, the configurable space comprising transient individual space, group individual space, and group function space; the set of past demands comprising information on arrival date, length of stay, rate category and room type requests for the transient individual space and group individual space; and
performing processing associated with calculating, by a processor, a potential past optimum yield that includes both a transient yield from the transient individual space, and a group yield from the group individual space and the group function space, wherein the performing processing associated with calculating comprises:
performing processing associated with determining constraints related to the configurable space;
performing processing associated with determining bounds related to the configurable space;
performing processing associated with identifying which past demands for the configurable space should have been accepted in order to optimize the potential past optimum yield, subject to the constraints and the bounds; and
performing processing associated with determining the potential past optimum yield utilizing the set of past demands;
performing processing associated with assigning a small value as a cost of a transient upgrade, and including the small value in the transient yield;
performing processing associated with determining a group space opportunity constraint that ensures that a group opportunity is fully satisfied before being accepted, wherein the group space opportunity constraint is $$\sum_{ART \geq RT} yOpp \cdot OID \cdot SD \cdot RT \cdot ART \geq N(OID, SD, RT) wOpp \cdot OID$$

wherein yOpp.OID.SD.RT.ART(RT) represents a number of rooms of allocated room type ART that are allocated to fill each accepted group demand OID, N(OID,DS,RT) represents a number of rooms associated with accepted group demand OID, wOpp.OID are a number of rooms allocated to fill each accepted group demand OID, DS is a stay date, AD is an arrival date, LS is a length of stay, RC is a rate category, and RT is a room type;

wherein the yield that could have been realized for a given demand amount had optimal decisions on whether to accept or deny a demand been made is compared to yield actually realized.

17. The system of claim 16, wherein:
the identifying is performed using a mixed integer linear programming technique;
the potential past optimum yield comprises revenue;
the potential past optimum yield comprises profit; or
the group function space is configured; or any combination thereof.

18. The system of claim 16, further comprising:
assigning a small value as a cost of a transient upgrade, and including the small value in the transient yield;
comparing a actual total yield to the potential past optimum yield; or
determining a configuration of the configurable space that satisfies the set of past demands; or any combination thereof.

19. A computerized system for calculating a potential past optimum yield for a configurable space, comprising:
a processor;
a memory, the memory connected to the processor, wherein the processor is configured for:
performing processing associated with obtaining a set of past demands including both past transient demands and past group demands for the configurable space for a designated time period, the configurable space comprising transient individual space, group individual space, and group function space; the set of past demands comprising information on arrival date, length of stay, rate category and room type requests for the transient individual space and group individual space; and
performing processing associated with calculating, by a processor, a potential past optimum yield that includes both a transient yield from the transient individual space, and a group yield from the group individual space and the group function space, wherein the performing processing associated with calculating comprises:
performing processing associated with determining constraints related to the configurable space;
performing processing associated with determining bounds related to the configurable space;
performing processing associated with identifying which past demands for the configurable space should have been accepted in order to optimize the potential past optimum yield, subject to the constraints and the bounds; and
performing processing associated with determining the potential past optimum yield utilizing the set of past demands;
performing processing associated with determining a group yield constraint that incorporates individual space cost information and function space cost information for a group opportunity, wherein the group yield constraint is $$\sum_{OID} Y(OID) wOpp \cdot OID$$

wherein Y(OID) is the yield associated with the group demand OID, and wOpp.OID are a number of rooms allocated to fill each accepted group demand OID wherein the yield that could have been realized for a given demand amount had optimal decisions on whether to accept or deny a demand been made is compared to yield actually realized.

20. The system of claim 19, wherein:
the identifying is performed using a mixed integer linear programming technique;
the potential past optimum yield comprises revenue;
the potential past optimum yield comprises profit; or
the group function space is configured; or any combination thereof.

21. The system of claim 19, further comprising:
assigning a small value as a cost of a transient upgrade, and including the small value in the transient yield;
comparing a actual total yield to the potential past optimum yield; or
determining a configuration of the configurable space that satisfies the set of past demands; or any combination thereof.

22. A computerized system for calculating a potential past optimum yield for a configurable space, comprising:
a processor;
a memory, the memory connected to the processor, wherein the processor is configured for:
performing processing associated with obtaining a set of past demands including both past transient demands and past group demands for the configurable space for a designated time period, the configurable space comprising transient individual space, group individual space, and group function space; the set of past demands comprising information on arrival date, length of stay, rate category and room type requests for the transient individual space and group individual space; and
performing processing associated with calculating, by a processor, a potential past optimum yield that includes both a transient yield from the transient individual space, and a group yield from the group individual space and the group function space, wherein the calculating comprises:
performing processing associated with determining constraints related to the configurable space;
performing processing associated with determining bounds related to the configurable space;
performing processing associated with identifying which past demands for the configurable space should have been accepted in order to optimize the potential past optimum yield, subject to the constraints and the bounds; and
performing processing associated with determining the potential past optimum yield utilizing the set of past demands;
performing processing associated with determining a function space constraint that ensures that a particular function space is not used more than once during a given time period, wherein the function space constraint is $$\sum_{SS \in C(SS)} sscfu \cdot DP \cdot SS \le 1.$$

wherein sscfu.DP.SS represents whether indivisible specific space (SS) is being used during a specific day part (DP), and C(SS) represents a set of all spaces that conflict with space SS;

wherein the yield that could have been realized for a given demand amount had optimal decisions on whether to accept or deny a demand been made is compared to yield actually realized.

23. The system of claim 22, wherein:
the identifying is performed using a mixed integer linear programming technique;
the potential past optimum yield comprises revenue;
the potential past optimum yield comprises profit; or
the group function space is configured; or any combination thereof.

24. The system of claim 22, further comprising:
assigning a small value as a cost of a transient upgrade, and including the small value in the transient yield;
comparing a actual total yield to the potential past optimum yield; or
determining a configuration of the configurable space that satisfies the set of past demands; or any combination thereof.

25. A computerized system for calculating a potential past optimum yield for a configurable space, comprising:
a processor;
a memory, the memory connected to the processor, wherein the processor is configured for:
performing processing associated with obtaining a set of past demands including both past transient demands and past group demands for the configurable space for a designated time period, the configurable space comprising transient individual space, group individual space, and group function space; the set of past demands comprising information on arrival date, length of stay, rate category and room type requests for the transient individual space and group individual space; and
performing processing associated with calculating, by a processor, a potential past optimum yield that includes both a transient yield from the transient individual space, and a group yield from the group individual space and the group function space, wherein the performing processing associated with calculating comprises:
performing processing associated with determining constraints related to the configurable space;
performing processing associated with determining bounds related to the configurable space;
performing processing associated with identifying which past demands for the configurable space should have been accepted in order to optimize the potential past optimum yield, subject to the constraints and the bounds; and
performing processing associated with determining the potential past optimum yield utilizing the set of past demands;
performing processing associated with determining an assigned function space constraint that ensures that an assigned function space is at least as big as a requested function space, wherein the assigned function space constraint is $$tsa \cdot DP \cdot TST = \sum_{SS \in C(TST)} sscfu \cdot DP \cdot SS$$

wherein tsa.DP.TST represents a target space available of a given target space type, sscfu.DP.SS represents whether indivisible specific space (SS) is being used during a specific day part (DP), and C(TST) represents a set of all indivisible specific spaces that produce target space type TST;

wherein the yield that could have been realized for a given demand amount had optimal decisions on whether to accept or deny a demand been made is compared to yield actually realized.

26. The system of claim 25, wherein:
the identifying is performed using a mixed integer linear programming technique;
the potential past optimum yield comprises revenue;
the potential past optimum yield comprises profit; or
the group function space is configured; or any combination thereof.

27. The system of claim 25, further comprising:
assigning a small value as a cost of a transient upgrade, and including the small value in the transient yield;
comparing a actual total yield to the potential past optimum yield; or
determining a configuration of the configurable space that satisfies the set of past demands; or any combination thereof.

28. A computerized system for calculating a potential past optimum yield for a configurable space, comprising:
a processor;
a memory, the memory connected to the processor, wherein the processor is configured for:
performing processing associated with obtaining a set of past demands including both past transient demands and past group demands for the configurable space for a designated time period, the configurable space comprising transient individual space, group individual space, and group function space; the set of past demands comprising information on arrival date, length of stay, rate category and room type requests for the transient individual space and group individual space; and
performing processing associated with calculating, by a processor, a potential past optimum yield that includes both a transient yield from the transient individual space, and a group yield from the group individual space and the group function space, wherein the performing processing associated with calculating comprises:
performing processing associated with determining constraints related to the configurable space;
performing processing associated with determining bounds related to the configurable space;
performing processing associated with identifying which past demands for the configurable space should have been accepted in order to optimize the potential past optimum yield, subject to the constraints and the bounds; and
performing processing associated with determining the potential past optimum yield utilizing the set of past demands;
performing processing associated with assigning a small value as a cost of a transient upgrade, and including the small value in the transient yield;
performing processing associated with determining an upgrade function space constraint that ensures that transient upgrades and group upgrades are not given when not necessary, wherein the upgrade function space constraint is $$\sum_{OID} N(OID, DP, TST) wOpp \cdot OID + \sum_{RTST|ATST=TST} upg \cdot DP \cdot RTST \cdot ATST -$$
$$\sum_{ATST|RTST=TST} upg \cdot DP \cdot RTST \cdot ATST \leq tsa \cdot DP \cdot TST \cdot$$

wherein N(OID, DP, TST) represents a number of target spaces of target space type TST demanded by opportunity ID OID during day part DP, wOpp.OID represents whether an opportunity is accepted or turned down, upg.DP.RTST.ATST represents an upgrade from a requested target space type to an assigned target space type, and tsa.DP.TST represents target space available for a given target space type;
wherein the yield that could have been realized for a given demand amount had optimal decisions on whether to accept or deny a demand been made is compared to yield actually realized.

29. The system of claim 28, wherein:
the identifying is performed using a mixed integer linear programming technique;
the potential past optimum yield comprises revenue;
the potential past optimum yield comprises profit; or
the group function space is configured; or any combination thereof.

30. The system of claim 28, further comprising:
assigning a small value as a cost of a transient upgrade, and including the small value in the transient yield;
comparing a actual total yield to the potential past optimum yield; or
determining a configuration of the configurable space that satisfies the set of past demands; or any combination thereof.

* * * * *